United States Patent
Tange et al.

(10) Patent No.: US 6,973,380 B2
(45) Date of Patent: Dec. 6, 2005

(54) LANE KEEP CONTROL APPARATUS AND METHOD FOR AUTOMOTIVE VEHICLE

(75) Inventors: Satoshi Tange, Kanagawa (JP); Shinji Matsumoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 160 days.

(21) Appl. No.: 10/695,799

(22) Filed: Oct. 30, 2003

(65) Prior Publication Data
US 2004/0102884 A1    May 27, 2004

(30) Foreign Application Priority Data
Nov. 26, 2002 (JP) .............................. 2002-342054

(51) Int. Cl.⁷ .............................................. G08G 1/16
(52) U.S. Cl. .................... 701/70; 701/96; 701/301; 340/436; 340/903
(58) Field of Search ............................ 701/70, 96, 301; 340/435, 436, 903

(56) References Cited

U.S. PATENT DOCUMENTS

| | | | | |
|---|---|---|---|---|
| 6,411,901 B1 * | 6/2002 | Hiwatashi et al. | .......... | 701/301 |
| 6,487,501 B1 * | 11/2002 | Jeon | ............. | 701/301 |
| 6,489,887 B2 * | 12/2002 | Satoh et al. | ............. | 340/436 |
| 6,708,098 B2 * | 3/2004 | Matsumoto et al. | ......... | 701/70 |

(Continued)

FOREIGN PATENT DOCUMENTS

| | | |
|---|---|---|
| JP | 05-314396 A | 11/1993 |
| JP | 09-081757 A | 3/1997 |
| JP | 11-96497 A | 4/1999 |
| JP | 11-296660 A | 10/1999 |
| JP | 2001-310719 A | 11/2001 |
| JP | 2001-344687 A | 12/2001 |
| JP | 2002-32125 A | 1/2002 |
| JP | 2002-160598 A | 6/2002 |

OTHER PUBLICATIONS

U.S. Appl. No. 10/693,946, filed Oct. 28, 2003, Matsumoto et al.

(Continued)

Primary Examiner—Gary Chin
(74) Attorney, Agent, or Firm—Foley & Lardner LLP (57) ABSTRACT

In lane keep control apparatus and method for an automotive vehicle, a behavior of the vehicle is controlled in such a manner that a yaw moment is developed in a direction to avoid a deviation of the vehicle from the traffic lane in accordance with the traveling state of the vehicle when determining that the vehicle has a tendency of the deviation of the vehicle from the traffic lane and lane markers are detected, each lane marker representing one side of the traffic lane, and the behavior of the vehicle is controlled on the basis of the detected lane marker at one side of the traffic lane when a detection state of the lane markers is transferred from a state in which both of the lane markers at both sides of the traffic lane are detected to a state in which the lane marker only at one side of the traffic lane is detected.

20 Claims, 8 Drawing Sheets

U.S. PATENT DOCUMENTS

| | | | |
|---|---|---|---|
| 6,732,021 B2 * | 5/2004 | Matsumoto et al. | 701/1 |
| 6,879,890 B2 * | 4/2005 | Matsumoto et al. | 701/23 |
| 2004/0098197 A1 | 5/2004 | Matsumoto et al. | |
| 2004/0107035 A1 | 6/2004 | Tange et al. | |
| 2004/0262063 A1 * | 12/2004 | Kaufmann et al. | 180/169 |
| 2005/0113999 A1 * | 5/2005 | Tange et al. | 701/41 |
| 2005/0125153 A1 * | 6/2005 | Matsumoto et al. | 701/300 |

OTHER PUBLICATIONS

U.S. Appl. No. 10/713,354, filed Nov. 17, 2003, Tange et al.

U.S. Appl. No. 10/825,108, filed Apr. 16, 2004, Matsumoto et al.

U.S. Appl. No. 10/828,462, filed Apr. 21, 2004, Matsumoto et al.

* cited by examiner

LANE KEEP CONTROL APPARATUS AND METHOD FOR AUTOMOTIVE VEHICLE

BACKGROUND OF THE INVENTION

1. Field of the Invention

The present invention relates to lane keep control apparatus and method for an automotive vehicle to prevent a deviation of the vehicle in which the lane keep control apparatus is mounted (also called, a host vehicle) from a traffic lane on which the vehicle is traveling when the host vehicle is about to be deviated from the traffic lane during the travel of the vehicle.

2. Description of the Related Art

A Japanese Patent Application First Publication No. Heisei 11-96497 published on Apr. 9, 1999 exemplifies a first previously proposed lane keep control apparatus in which, for example, a controller determines that the host vehicle is about to be deviated from the traffic lane and outputs a steering torque to a degree such that a vehicular driver's force easily overcomes via a steering actuator in accordance with a lateral deviation quantity (variable) of the host vehicle with respect to a reference position of the traffic lane to prevent the host vehicle from being deviated from the traffic lane.

In addition, since the above-described first previously proposed lane keep control apparatus requires a steering actuator, for example, a braking force or a driving force is controlled using an anti-skid control system or driving force control system is used to control the braking or driving force. Consequently, it may be considered that a yaw moment is developed on the vehicle to control a running direction of the host vehicle or running position of the host vehicle. Then, in such a previously proposed lane keep control apparatus as described above, it is desirable that the traffic lane is always continued to be detected. Then, another previously proposed lane keep control apparatus in which, for example, a steering angle is set as a road parameter, a lane marker model such as a white line is set (as disclosed in another Japanese Patent Application No. Heisei 11-296660 published on Oct. 29, 1999).

SUMMARY OF THE INVENTION

However, in order to detect the traffic lane correctly, it is necessary to detect the lane markers at both sides (side ends) of the traffic lane (the traffic lane is usually present on a road segment between two lane markers). Hence, when the lane markers located at both sides of the traffic lane cannot be detected, the above-described second previously proposed lane keep control apparatus suspends the traffic lane keep control. However, when at least one side of the lane markers toward which the host vehicle is deviated can be detected, a condition to continue the lane keep control itself is established. Hence, in this case, if the control is suspended, a deviation from a driver's drive feeling occurs so that the driver tends to give an unpleasant feeling (a sense of incompatibility to the driver occurs).

It is, hence, an object of the present invention to provide lane keep control apparatus and method for an automotive vehicle which can eliminate the deviation in a driver's drive feeling and are capable of not giving the driver a sense of incompatibility thereto.

According to one aspect of the present invention, there is provided a lane keep control apparatus for an automotive vehicle, comprising: a traffic lane detecting section that detects a traffic lane on which the vehicle is running; a traveling state detecting section that detects a traveling state of the vehicle; a deviation determining section that determines whether the vehicle has a tendency to be deviated from the traffic lane according to the traffic lane detected by the traffic lane detecting section and the traveling state of the vehicle detected by the traveling state detecting section; and a vehicular behavior controlling section that controls a behavior of the vehicle in such a manner that a yaw moment of the vehicle is developed in a direction to avoid a deviation of the vehicle from the traffic lane in accordance with the traveling state detected by the traveling state detecting section when the deviation determining section determines that the vehicle has a tendency of the deviation of the vehicle from the traffic lane, the traffic lane detecting section including a lane marker detecting section that detects lane markers, each lane marker representing one side of the traffic lane, and the vehicular behavior controlling section controlling the behavior of the vehicle on the basis of the detected lane marker at one side of the traffic lane when the lane marker detecting section transfers a detection state from a state in which both of the lane markers at both sides of the traffic lane are detected to a state in which the lane marker only at one side of the traffic lane is detected.

According to another aspect of the present invention, there is provided a lane keep control method for an automotive vehicle, comprising: detecting a traffic lane on which the vehicle is running; detecting a traveling state of the vehicle; determining whether the vehicle has a tendency to be deviated from the traffic lane according to the detected traffic lane and the detected traveling state of the vehicle; and controlling a behavior of the vehicle in such a manner that a yaw moment of the vehicle is developed in a direction to avoid a deviation of the vehicle from the traffic lane in accordance with the detected traveling state when determining that the vehicle has a tendency of the deviation of the vehicle from the traffic lane, during the traffic lane detection, detecting lane markers, each lane marker representing one side of the traffic lane, and controlling the behavior of the vehicle on the basis of the detected lane marker at one side of the traffic lane, when a detection state is transferred from a state in which both of the lane markers at both sides of the traffic lane are detected to a state in which the lane marker only at one side end of the traffic lane is detected.

This summary of the invention does not necessarily describe all necessary features so that this invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
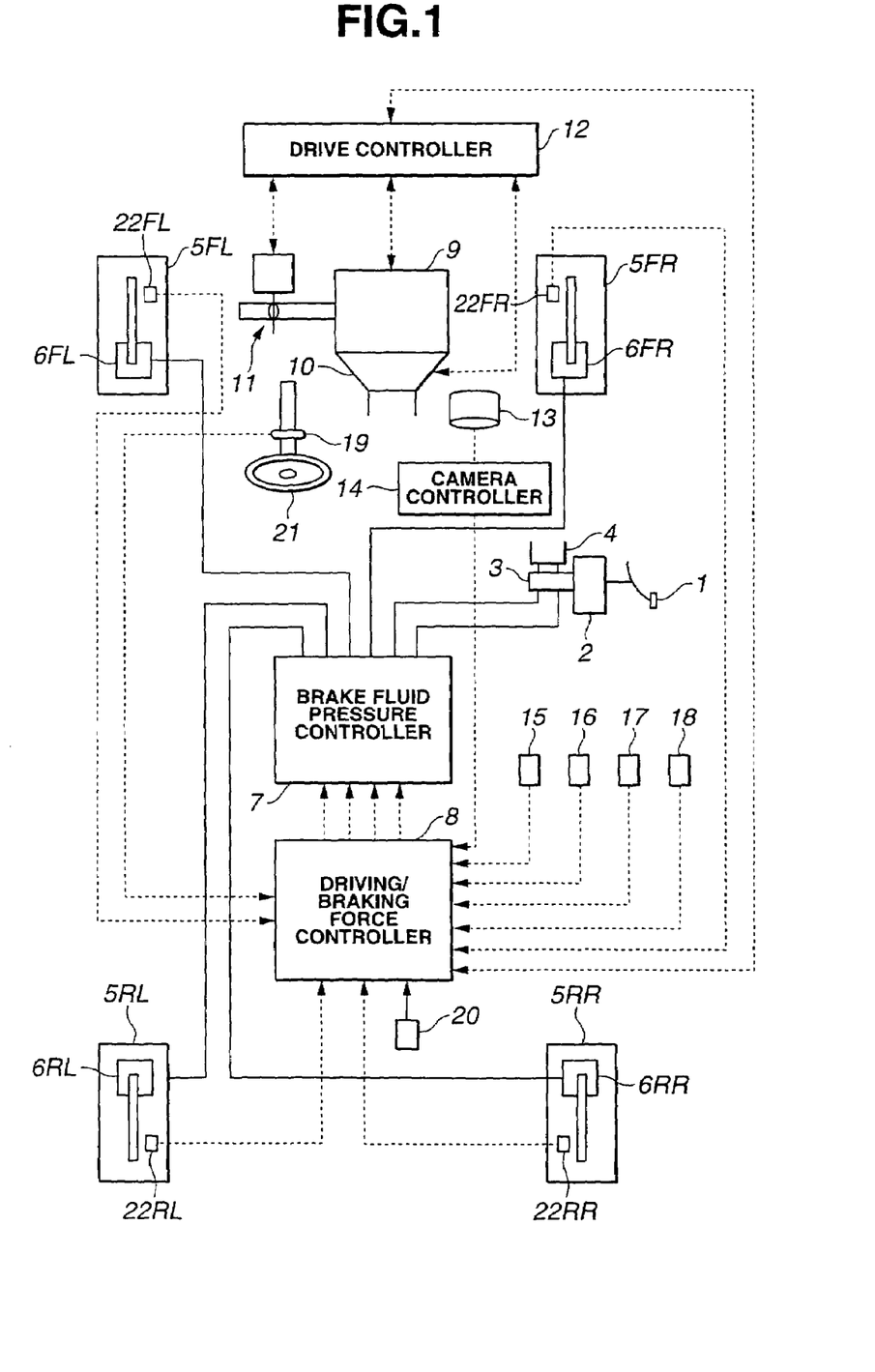
FIG. 1 is a rough configuration view of an automotive vehicle to which a lane keep control apparatus in a first preferred embodiment according to the present invention is applicable.

FIG. 1 shows a rough configuration view of an automotive vehicle to which a lane keep control apparatus in a first preferred embodiment according to the present invention is applicable. The vehicle used in the first embodiment is a rear-wheel driven vehicle in which an automatic transmission and a conventional differential gear are mounted and a vehicular brake system is mounted so as to be enabled to control braking forces applied to front left and rear left road wheels independently of each other and front right and rear right road wheels independently of each other. In FIG. 1, in the brake system of the vehicle (host vehicle), a brake pedal 1 is mounted, a brake force (booster) 2 is mounted, a master cylinder 3 is mounted, and a reservoir 4 is mounted. Usually, in accordance with a depression depth of brake pedal 1 by the vehicle driver, a brake fluid pressure boosted by means of a master cylinder 3 is supplied to each wheel cylinder 6FL through 6RR of corresponding one of road wheels 5FL through 5RR (FL means front left, FR means front right, RL means rear left, and RR means rear right). A brake fluid control circuit 7 is interposed between master cylinder 3 and each wheel cylinder 6FL through 6RR. It is possible to control individually and separately the brake fluid pressure of each wheel cylinder 6FL through 6RR. Brake fluid pressure control circuit 7 utilizes the brake fluid pressure control circuit used in, for example, an anti-skid control system and/or a traction control system. In this embodiment, the brake system is so structured that the brake fluid pressure of each wheel cylinder 6FL, 6FR, 6RL, and 6RR can be increased or decreased individually (solely). Brake fluid pressure control circuit 7 controls the brake fluid pressure to each wheel cylinder 6FL through 6RR in accordance with a brake fluid pressure command value from a driving force/braking force controller 8 as will be described later.

A drive (torque) controller 12 is installed which controls a drive torque to rear left and right road wheels 5RL and 5RR which are driven wheels. A drive state control of an engine 9 can be controlled, for example, by controlling a fuel injection quantity and by controlling an ignition timing. Simultaneously, the drive state control of engine 9 can be controlled by controlling an opening angle of the throttle valve by the drive controller 12. The drive (torque) controller 12 can control drive torque of rear left and right road wheels 5RL and 5RR which are driven wheels, solely, However, when a command value of the drive torque of rear road wheels 5RL and 5RR from braking/driving force controller 8 is inputted, driven wheel torques are controlled by referring to the drive torque command value.

In addition, a CCD (Charge Coupled Device) camera 13 and a camera controller 14 are provided as an external world recognition sensor to detect a position of the vehicle itself. Camera controller 14 detects lane markers such as white lines to detect the traffic lane on which the host vehicle is traveling from a photographed image in front of the vehicle trapped by CCD camera 13 and can calculate a yaw angle $\phi$ of the host vehicle with respect to the traffic lane, viz., a direction of the host vehicle with respect to the traffic lane, a lateral displacement X with respect to the traffic lane, a curvature $\beta$ of the traffic lane as will be described later, and a traffic lane width L. It is noted that camera controller 14 detects the traffic lane on which the host vehicle is running (traveling) using a traffic lane detection area to detect the lane markers as will be described later. Each of various data is calculated for the traffic lane detected as described above.

The vehicle shown in FIG. 1 includes: an acceleration sensor-15 to detect a longitudinal acceleration Xg developed on the vehicle and to detect a lateral acceleration Yg; a yaw rate (velocity) sensor 16 to detect a yaw rate $\phi'$ developed on the vehicle; a master cylinder pressure sensor 17 to detect an output pressure of mater cylinder 3 (so called, a master cylinder pressure Pm); an accelerator opening angle sensor 18 to detect the depression depth of accelerator pedal, viz., opening angle Acc of the accelerator pedal; road wheel velocity sensors 22FL through 22RR to detect the revolution speeds of respective road wheels 5FL through 5RR, so-called, road wheel velocities Vwi (i= FL, FR, RL, and RR); a steering angle sensor 19 to detect a steering angle $\delta$ of steering wheel 21; and a direction indicator switch 20 to detect a direction indication operation by means of a direction indicator. The direction signals are supplied to driving/braking force controller 8. In addition, yaw angle $\phi$ of the host vehicle with respect to the traffic lane detected by camera controller 14, a lateral displacement X from a center of the traffic lane therefrom detected by camera controller 14, lane width L of the traffic lane detected by camera controller 14 are outputted to braking/driving force controller 8 in addition to drive torque controller 12. It is noted that in a case where a directivity of the left and right is inherently present in the running state data of the detected vehicle, a left direction provides a positive direction. That is to say, yaw rate $\phi'$, lateral acceleration Yg, steering angle $\delta$, and yaw angle $\phi$ are positive values when the vehicle turns in the leftward direction. Lateral displacement X is positive value when deviated in the leftward direction from the center of the traffic lane.

Figure 2:
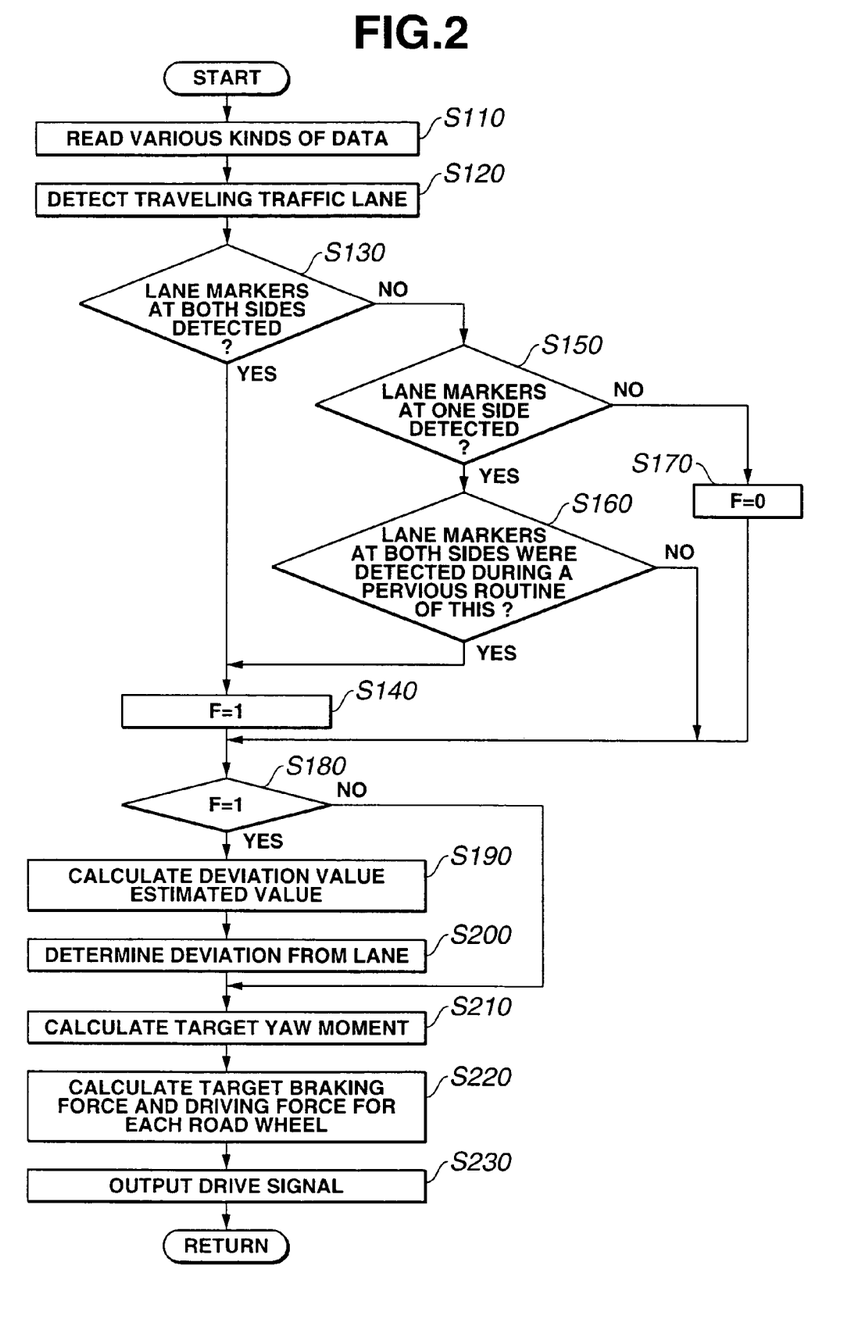
FIG. 2 is an operational flowchart for explaining a lane keep control procedure executed by a braking/driving force controller in the first preferred embodiment shown in FIG. 1.
Figure 3:
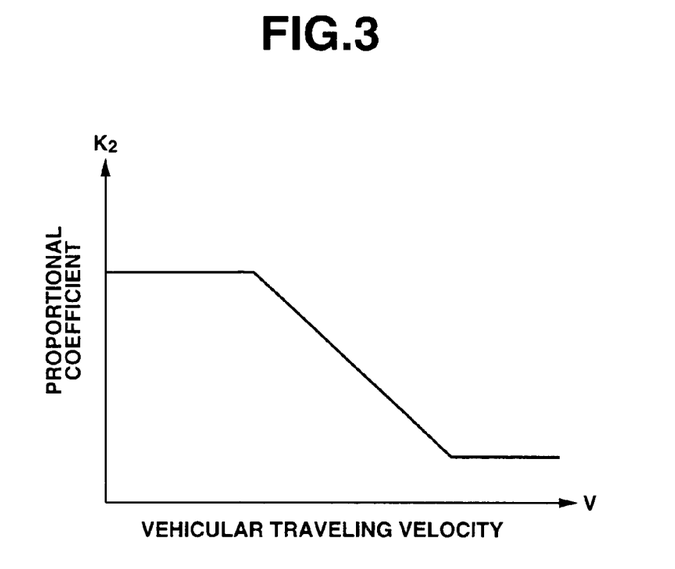
FIG. 3 is a control map used for calculating a target yaw moment described in the first embodiment and calculated in a lane keep control procedure shown in FIG. 2.

FIG. 2 shows an operational flowchart for explaining a logic of operation executed in braking/driving force controller in the first embodiment.

The calculation processing shown in FIG. 2 is executed for each time of a predetermined sampling period $\Delta T$, for example, 10 milliseconds as a timer interrupt routine. It is noted that there is no step to communicate with any one of the other controllers and the information obtained by the communication processing is sequentially stored into a memory and updated and the necessary information is read arbitrarily from the memory.

At a step S110, braking/driving force controller 8 reads various kinds of data from each sensor, controller, and other control circuits. Specifically, braking/driving force controller 8 reads longitudinal acceleration Xg, lateral acceleration Yg, yaw rate $\phi'$, each wheel velocity Vwi, acceleration opening angle Acc, master cylinder pressure Pm, a steering angle sensor $\delta$, direction indicating switching signal, and drive torque Tw from drive torque controller 12. Then, at step S110, braking/driving force controller 8 derives a traveling velocity V of the host vehicle from an average value of the front road wheel velocities $Vw_{FR}$ and $Vw_{FL}$ which are non-driven wheels. It is noted that, at this time point, yaw angular displacement of $\phi$, lateral displacement X from the center of the traffic lane, curvature $\beta$ of the traffic lane, and lane width L of the traffic lane are not yet read.

Figure 4A:
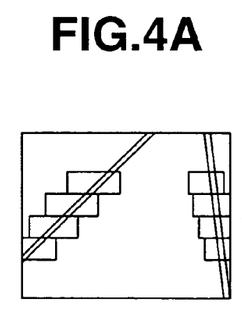
FIGS. 4A, 4B, and 4C are integrally an explanatory view for explaining an action of the lane keep control procedure executed in the raking/driving force controller described in the first preferred embodiment shown in FIG. 1.
Figure 4B:
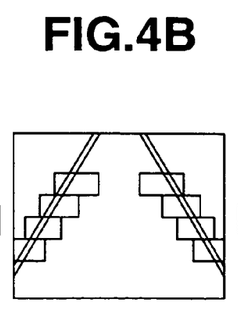
Figure 4C:
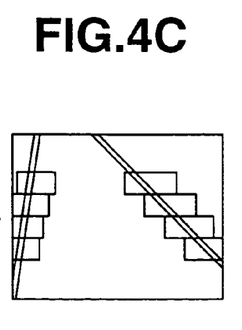

At the next step S120, using a technique disclosed in Japanese Patent Application First Publication No. 11-296660 published on Oct. 29, 1999, a traffic lane detection area, specifically, a lane marker detection area is set on the basis of a steering angle $\delta$ read at step S110 (refer to FIGS. 4A through 4C). On the basis of the set lane marker detection area, the lane markers located at both sides of the traffic lane on which the vehicle is running are detected. Using the detected lane markers, braking/driving force controller 8 commands camera controller 8 to detect the running traffic lane on which the vehicle is running on the basis of the lane marker detection area. At the same time, braking/driving force controller 8 reads the data of the yaw angle $\phi$ of the host vehicle, lateral displacement X from the center of the traffic lane, curvature $\beta$ of the traffic lane, and lane width L of the traffic lane.

At the next step S130, braking/driving force controller 8 determines if the lane markers located at both sides of the lane on which the vehicle is running have been detected. If the lane markers located at both sides of the lane are detected (Yes) at step S130, the routine goes to a step S140. On the other hand, if have not been detected (No) at step S130, the routine goes to a step S150. At step S150, braking/driving force controller 8 determines if only either one of the lane markers located at one side of the traffic lane is detected. If only either one of the lane markers located at one side of the traffic lane is detected (Yes) at step S150, the routine goes to a step S160. If not either one nor neither all of the traffic lane is detected (No) at step S150, the routine goes to a step S170. It is noted that the reason that the determination of whether either one of the lane markers located at either side of the lane is detected or not is that a deviation tendency of the host vehicle to the traffic lane does not permit the lane markers located at an opposite side of the deviation direction to be detected but the lane marker located at the same side toward which the deviation of the host vehicle occurs can be deemed to be enabled to be detected. At step S160, braking/driving force controller 8 determines if, at a time of a previous calculation cycle (process) of the present processing of FIG. 2, the lane markers located at both sides of the traffic lane have been detected. If Yes at step S160, the routine goes to a step S140. If No at step S160, the routine goes to a step S180. The reason that the determination of whether, at the previous calculation shown in FIG. 2, the lane markers located at both sides of the traffic lane have been detected is that, in a case where a state is transferred from a state in which the lane markers located at both sides of the lane markers are detected to a state in which the lane markers located at only one side of the traffic lane are detected, it can be deemed to be a high possibility (a high certainty) that a certainty that the matters detected at only one side are the lane markers becomes high.

At step S170, braking/driving force controller 8 forces a deviation prevention control enabling flag (or a lane keep control) enabling flag F to a reset state of "0".

Then, the routine goes to step S180. On the other hand, at step S140, deviation prevention control enabling flag F is set to "1" and the routine goes to step S180. At step S180, braking/driving force controller 8 determines if deviation prevention control flag F is set to a state of "1". If Yes ("1") at step S180, the routine goes to a step S190. If not (No) at step S180, the routine goes to a step S210.

At step S190, braking/driving force controller 8 calculates a future lateral displacement of Xs as a deviation estimated value and the routine goes to a step S200. Specifically, braking/driving force controller 8 calculates the future lateral displacement in accordance with equation (2) using yaw angle $\phi$ of the read host vehicle with respect to the traffic lane read at step S120, lateral displacement X from the center of the traffic lane, curvature $\beta$ of the traffic lane, and a traveling speed V of the vehicle calculated at step S110.

$$Xs = Tt \times V \times (\phi + Tt \times V \times \beta) + X \quad (2).$$

In equation (2), Tt denotes a vehicle head-away time used for calculating a distance of a forward observation and Tt multiplied with traveling speed V indicates a forward observation distance. In other words, the estimated value of lateral displacement X from a center of the traffic lane after the head-away time of Tt denotes a future lateral displacement Xs. As will be described hereinafter, in the first embodiment, braking/driving force controller 8 determines that there is a possibility that the vehicle is deviated from the traffic lane when this future estimated lateral displacement Xs is equal to or larger than a predetermined lateral displacement limit value $X_c$ or determines that the vehicle has the tendency of the deviation.

Then, the routine goes to a step S200 from step S190. After, at step S200, braking/driving force controller 8 determines whether the vehicle falls in the deviation tendency from the traffic lane, the routine goes to a step S210. Specifically, when an absolute value |Xs| of the future estimated lateral displacement as the deviation estimated value calculated at step S190 is equal to or higher than a limit value of the lateral displacement Xc, a deviation determination flag $F_{LD}$ is set since the vehicle has the tendency of deviating from the traffic lane. If not so, deviation determination flag $F_{LD}$ is reset since the host vehicle has no tendency of the deviation from the traffic lane. It is noted that, if the traffic lane change direction estimated by the input from running traffic lane of the vehicle is made coincident with the deviation direction from the traffic lane, deviation determination flag $F_{LD}$ is reset. Then, at step S200, such a determination that some alarming is needed to inform that the host vehicle is tended to be deviated from the traffic lane may be executed. Specifically, the alarming is made by the braking/driving force controller 8 that the absolute value of |Xs| of future estimated lateral displacement as the deviation estimated value calculated at step S190 is equal to or larger than lateral displacement limit value $X_c$ which is a subtraction of a half value of vehicle width $L_0$ of the host vehicle from a half value of width L of traffic lane read at step S120. If not so, no alarming is made. There may be any other informing method.

At a step S210, braking/driving force controller 8 calculates and sets target yaw moment Ms to prevent the traffic lane from being deviated therefrom. It is noted that, since target yaw moment Ms is set only when deviation determination flag $F_{LD}$ is set, target yaw moment Ms is calculated in accordance with the following equation (3). It is also noted that, when deviation determination flag $F_{LD}$ is reset, target yaw moment Ms is forced to zero ("0"). Next, the routine goes to a step S220. At step S220, braking/driving force controller 8 calculates target braking/driving fluid pressure Psi and a target driving force for the driven wheels (rear left and right road wheels (5RL and 5RR). Specifically, suppose that rear road wheel master cylinder pressure based on the longitudinal (forward-and-rearward) braking force distribution is $P_{mR}$ with respect to master cylinder pressure Pm read out at step S110 when deviation determination flag $F_{LD}$ is reset. Target braking fluid pressure $P_{sFL}$ and $P_{sFR}$ for front left and right road wheels 5FL and 5FR using wheel cylinders 6FL and 6FR indicate master cylinder pressure Pm. Target braking fluid pressures $P_{sRL}$ and $P_{sRR}$ toward wheel cylinders 6RL and 6RR of rear left and right road wheels 5RL and 5RR are, respectively, rear road wheel master cylinder pressure $P_{mR}$. On the other hand, even if deviation determination flag $F_{LD}$ is set, a situation branching is carried out in accordance with a magnitude of target yaw moment Ms calculated at step S210. That is to say, if an absolute value |Ms| of target yaw moment is smaller than a predetermined value $M_{s0}$, a difference is developed only by the driving force for rear left and right road wheels 5RL and 5RR. Hence, if front left and right road wheel braking fluid pressure difference $\Delta P_{sF}$ when an absolute value |Ms| of target yaw moment is less than predetermined value $M_{s0}$ is zero and rear left and right road wheel target braking fluid pressure difference $\Delta P_{sR}$ is given in the following equation (4). In the similar manner, front left and right road wheel target braking fluid pressure difference $\Delta P_{sF}$ when absolute value |Ms| of target yaw moment is equal to or larger than a predetermined value $M_{s0}$ is given in the following equation (5). Rear left and right road wheel target braking fluid pressure difference $\Delta P_{sR}$ is given in the following equation of (6). In equations (4) through (6), T denotes a tread (assuming that the tread is the same between the front and rear road wheels) and $K_{bF}$ and $K_{bR}$ denote conversion coefficients to convert the driving force into the braking fluid pressure and is determined according to braking specifications.

$$\Delta P_{sR}=2\times K_{bR}\times |Ms|/T \quad (4)$$

$$\Delta P_{sF}=2\times K_{bF}\times (|MS|-M_{s0})/T \quad (5)$$

$$\Delta P_{sR}=2\times K_{bR}\times |M_{s0}|/T \quad (6)$$

Hence, if target yaw moment Ms is a negative value, namely, target braking fluid pressure Psi to each wheel cylinder 6FL through 6RR when the vehicle traveling direction is about to be deviated toward a leftward direction, target braking fluid pressure Psi is given in the following equation (7) (i=FL, FR, RL, RR).

$$P_{SFL}=Pm$$

$$P_{SFR}=Pm+\Delta P_{SF}$$

$$P_{SRL}=Pm$$

$$P_{SRR}=Pm+\Delta P_{sR} \quad (7).$$

On the other hand, if target yaw moment Ms is a positive value, target braking fluid pressure Psi for each wheel cylinder 6FL through 6RR when the host vehicle is about to be deviated toward a rightward direction, target braking fluid pressure Psi is given in the following right equation.

$$P_{sFL}=Pm+\Delta P_{SF}$$

$$P_{sFR}=Pm$$

$$P_{sRL}=Pm+\Delta P_{sR}$$

$$P_{sRR}=Pm \quad (8).$$

In addition, in this embodiment, when deviation determination flag $F_{LD}$ is set to "1" and the traffic lane keep control is executed, the engine output is throttled so that a vehicular acceleration cannot be carried out even if a manipulation of accelerator pedal is carried out. Hence, target drive torque $Trq_{DS}$ when deviation determination flag $F_{LD}$ is set is charged from the value in accordance with accelerator opening angle Acc read at step S110 from which a sum of front and rear road wheel target braking fluid pressure difference $\Delta P_{SF}$ and $\Delta P_{SR}$ is subtracted. In other words, the vehicle in accordance with accelerator opening angle value indicates the drive torque to accelerate the vehicle in accordance with the accelerator opening angle Acc. The value in accordance with the sum of the front and rear target braking fluid pressure difference $\Delta P_{SF}$ and $\Delta P_{SR}$ indicates the drive torque developed according to a sum of the target brake fluid pressure difference $\Delta P_{SF}$ and $\Delta P_{SR}$.

Hence, when the lane keep control (traffic lane deviation prevention control) is executed, with deviation determination flag $F_{LD}$ set. The engine torque is reduced by the drive torque developed by the sum of $\Delta P_{sF}$ and $\Delta P_{sR}$. It is noted that target drive torque $trq_{DS}$ when deviation determination flag $F_{LD}$ is reset is only the drive torque to accelerate the host vehicle in accordance with accelerator opening angle Acc. At the next step S230, braking/driving force controller 8 outputs the target braking fluid pressure toward braking fluid pressure control circuit 7, outputs the target drive torque to drive torque controller 12, and the routine of FIG. 2 is returned at a main program (not shown).

Figure 5:
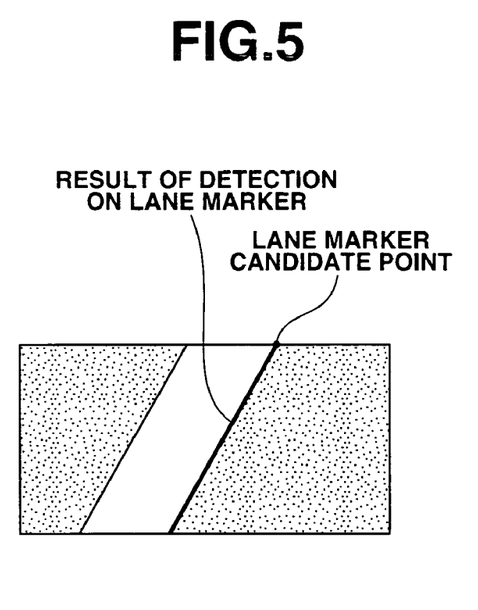
FIG. 5 is an explanatory view for explaining an action of the control procedure for a lane marker detection executed in the braking/driving force controller in the first embodiment shown in FIG. 1.
Figure 6:
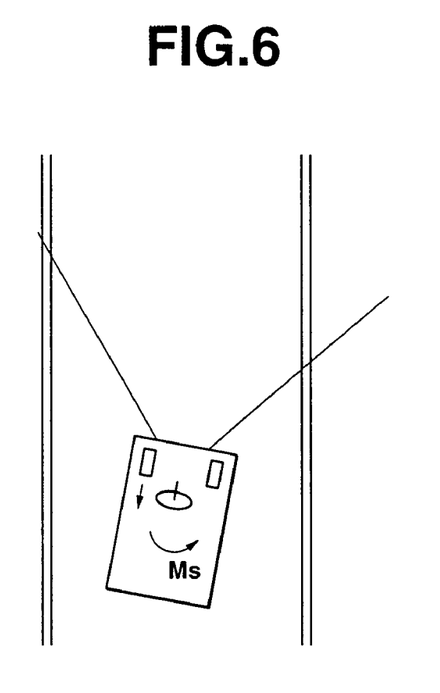
FIG. 6 is an explanatory view for explaining an action of the lane keep control procedure executed in the braking/driving force controller described in the first preferred embodiment shown in FIG. 1.

Next, the action of tracing the lane markers will be described below. In this embodiment, for example, as shown in FIGS. 4A, 4B, and 4C, from among images photographed with CCD camera 13, the lane marker detection area is set to detect the lane markers such as white lines. Specifically, when the lane markers are detected (scanned) over the whole area of the image photographed, a calculation load is heavy and it takes a lot of time for an image processing. Therefore, a further smaller detection area (so-called, a window and this is the lane marker detection area) is set on regions of an image screen having a high possibility of a presence of the lane markers and the lane marker is detected within the detection regions. In general, since, if this direction of the host vehicle with respect to the traffic lane is changed, the positions of the lane markers on the image screen are also changed. Hence, in the above-described Japanese Patent Application First Publication No. Heisei 11-296660 published on Oct. 29, 1999, the direction of the vehicle with respect to traffic lane is estimated from steering angle δ, the detection regions are set on areas, each area having a high possibility of being viewed in the image screen. Then, when a further processing such as to become conspicuous (high contrast) with a boundary between the lane marker and road surface is carried out, a straight line which can be deemed to be a most probable boundary line between the lane marker and road surface is detected. A single point on the straight line (lane marker candidate point) is detected as a representative position of the lane marker. In this embodiment, as shown in FIG. 5, an uppermost point as a result of the detection is detected as a lane marker candidate point. The number of lane marker candidate points become equal to or greater than a preset value (PREF). At this time, the detected lane markers are deemed to be correct. On the other hand, if the number of lane marker candidate points are less than the preset value, the detected lane markers are not deemed to be correct. Furthermore, if a total number of the lane marker candidate points for those located at both sides of the traffic lane is not equal to nor larger than the preset value, the lane markers located at both sides of the lane markers are not correctly detected. According to the calculation processing of FIG. 2, the deviation prevention control (lane keep control) enable flag F is set when the lane markers located at both sides of the traffic lane are detected. Then, when no intentional traffic lane change by the drive occurs and future estimated lateral displacement Xs becomes equal to or larger than lateral displacement limit value $X_c$, the host vehicle is determined that the vehicle tends to be deviated from the traffic lane, deviation determination flag $F_{LD}$ is set, target yaw moment Ms on the basis of the difference between the future lateral displacement Xs and lateral displacement limit value $X_c$, and the braking force of each road wheel is controlled so as to achieve the target yaw moment. Thus, when, for example, steering input is small, the yaw moment is developed to prevent the vehicle from being deviated from the traffic lane and the vehicular velocity is reduced due to the braking force. Hence, a more safe deviation of the vehicle from the traffic lane can be prevented. In the first embodiment, while the lane keep control is executed, the output torque of the engine is reduced and traveling speed V of the vehicle is reduced. Hence, a further safety vehicular deviation from the traffic lane can be prevented.

In addition, in this embodiment, even when the lane marker located only at one side of the traffic lane can be detected, deviation prevention control enable flag F is set when the lane markers at both sides of the lane were previously detected. Thus, in the same way as the detection of the lane markers at both sides of the traffic lane, the lane keep control to prevent the host vehicle from being deviated from the traffic lane is continued to be carried out. Consequently, even if only the lane marker at one side, for example, present in the deviation direction is detected, the lane keep control is continued. It gives the vehicle driver no sense of incompatibility without deviation from the drive feeling.

Each sensor shown in FIG. 1, camera controller 14, and steps S110 and S120 constitute traveling state detecting means (section) and step S120 shown in FIG. 2 constitutes traffic lane detecting means (section) and lane marker detecting means (section). Steps S190 and S200 in FIG. 2 constitute deviation determining means (section). Steps S210 and S230 constitute vehicular behavior controlling means (section), braking fluid pressure control circuit 7 and drive torque controller 12 shown in FIG. 1 constitute vehicular behavior controlling means (section), and step S230 in FIG. 2, the braking fluid pressure control circuit 7 and drive torque controller 12 constitute braking-and-driving force controlling means (section).

Figure 7:
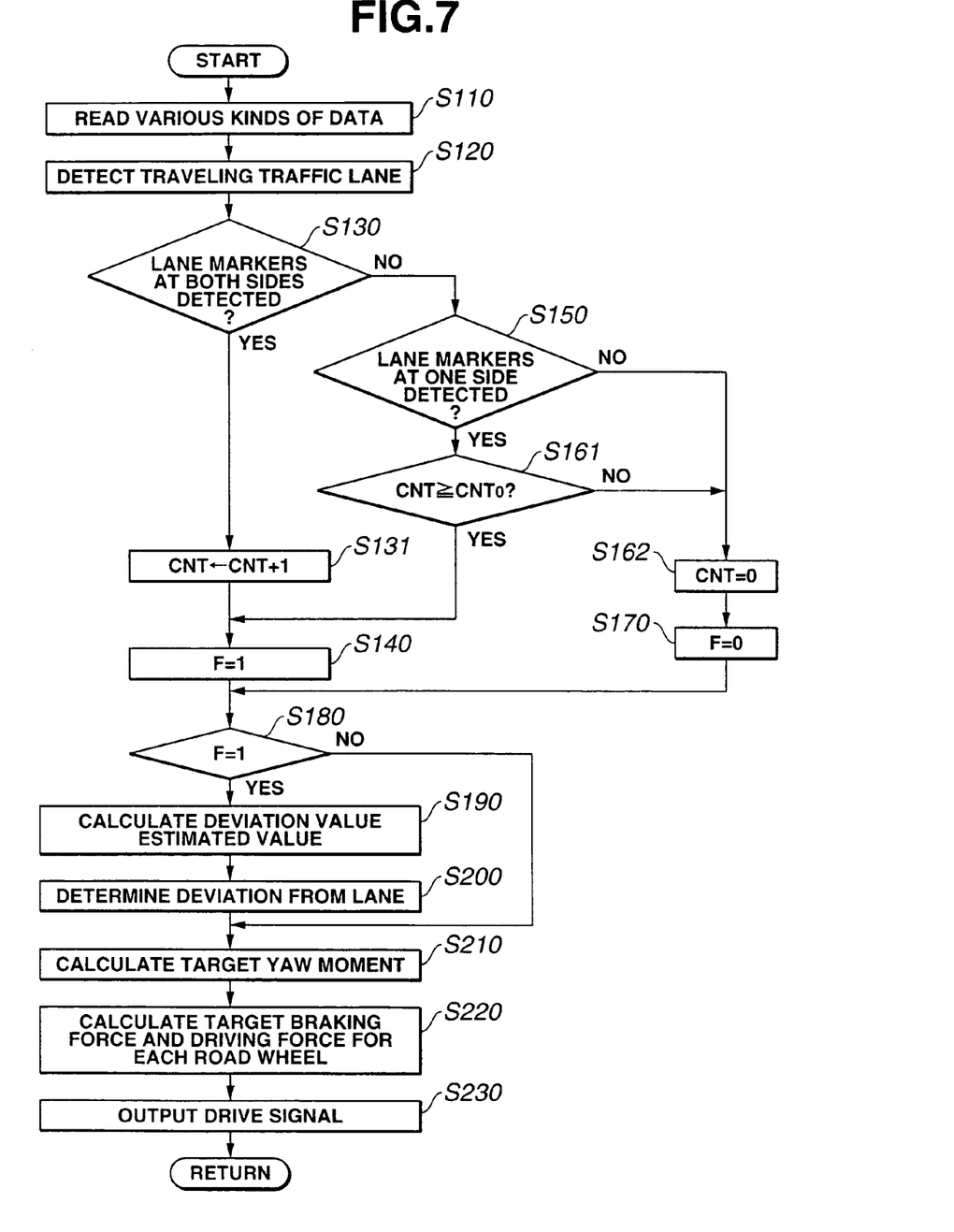
FIG. 7 is an operational flowchart executed in the lane keep control apparatus by means of the braking/driving force controller in a second preferred embodiment according to the present invention.

Next, a second preferred embodiment of the vehicular lane keep control apparatus according to the present invention will be described. The hardware structure in the second embodiment is generally the same as that of the first embodiment shown in FIG. 1. FIG. 7 shows an operational flowchart of the lane keep control executed in the second embodiment of the lane keep control apparatus of braking/driving force controller 8. The same numbered steps shown in FIG. 7 correspond to the like steps of the same numbered steps shown in FIG. 2. Hence, the same step numbers as shown in FIGS. 2 and 7 will be omitted herein. A step S131 is interposed between steps S130 and S140, a step S161 is interposed between steps S150 and S140, and a step S162 is interposed between steps S150 and S170.

That is to say, at step S131 shown in FIG. 7, both-side lane marker detection counter CNT as will be described later is incremented and the routine shown in FIG. 7 goes to step S140. At step S161, braking/driving force controller 8 determines if both-side lane marker detection counter CNT is equal to or greater than a predetermined value CNTo. If CNT≧CNTo at step S161 (Yes), the routine goes to step S140. If No (CNT<CNTo) at step S161, the routine goes to step S162. At step S162, both-side lane marker detection counter CNT are cleared and the routine goes to step S170. According to the calculation processing described above, both-side lane marker detection counter CNT is incremented when the lane markers located at both sides of the lane are detected and, when the lane marker located at only one side can be detected (at step S150), deviation prevention control enable flag F is set provided that the count value of both side lane marker detection counter CNT is equal to or greater than predetermined value CNTo, the lane keep control (traffic lane deviation prevention control) is carried out in the same way as the first preferred embodiment. It is noted that both-side lane marker detection counter CNT represents the certainty of the detection of the lane markers located at both sides of the traffic lane. If this certainty is high, the lane keep control is continued even if only the lane marker located at one side of the lane is detected. Usually, even if the lane marker is detected only at one side of the lane, the traffic lane keep control is continued. Usually, when the vehicle is tried to be deviated from the traffic lane on which the vehicle is running, as appreciated from FIGS. 4A, 4B, 4C, and 6, at first, the lane markers located at both sides of the lane are detected and, soon, only the lane marker located at one side which is in the deviation direction is detected. Hence, if the detection time duration of the lane markers located at both sides of the lane is long and, thereafter, only the lane marker at either side of the traffic lane cannot be detected, the vehicle tends to be about to be deviated. Hence, if the lane keep control is continued, a suppression of the vehicle from the deviation thereof from the traffic lane can be assured.

As described above, in the second embodiment, each sensor shown in FIG. 1, camera controller 14 and steps S110 and S120 shown in FIG. 7 constitute traveling state detecting means (section), step S120 shown in FIG. 7 constitutes traffic lane and lane marker detecting means (section), step S131 in FIG. 7 and step S161 constitute lane marker certainty detecting means (section), step S190 and step S200 shown in FIG. 7 constitutes deviation determining means (section), steps S210 through S230, the brake fluid pressure control circuit 7 and drive (torque) controller 12 constitutes vehicular behavior controlling means (section). Step S130 shown in FIG. 7, brake fluid pressure control circuit 7 shown in FIG. 1, and drive (torque) controller 12 constitute braking/driving force controlling means (section).

Next, a third preferred embodiment of the traffic lane keep control apparatus according to the present invention will be described below.

The rough configuration of the vehicle is the same as that described in the first embodiment with reference to FIG. 1.

Figure 8:
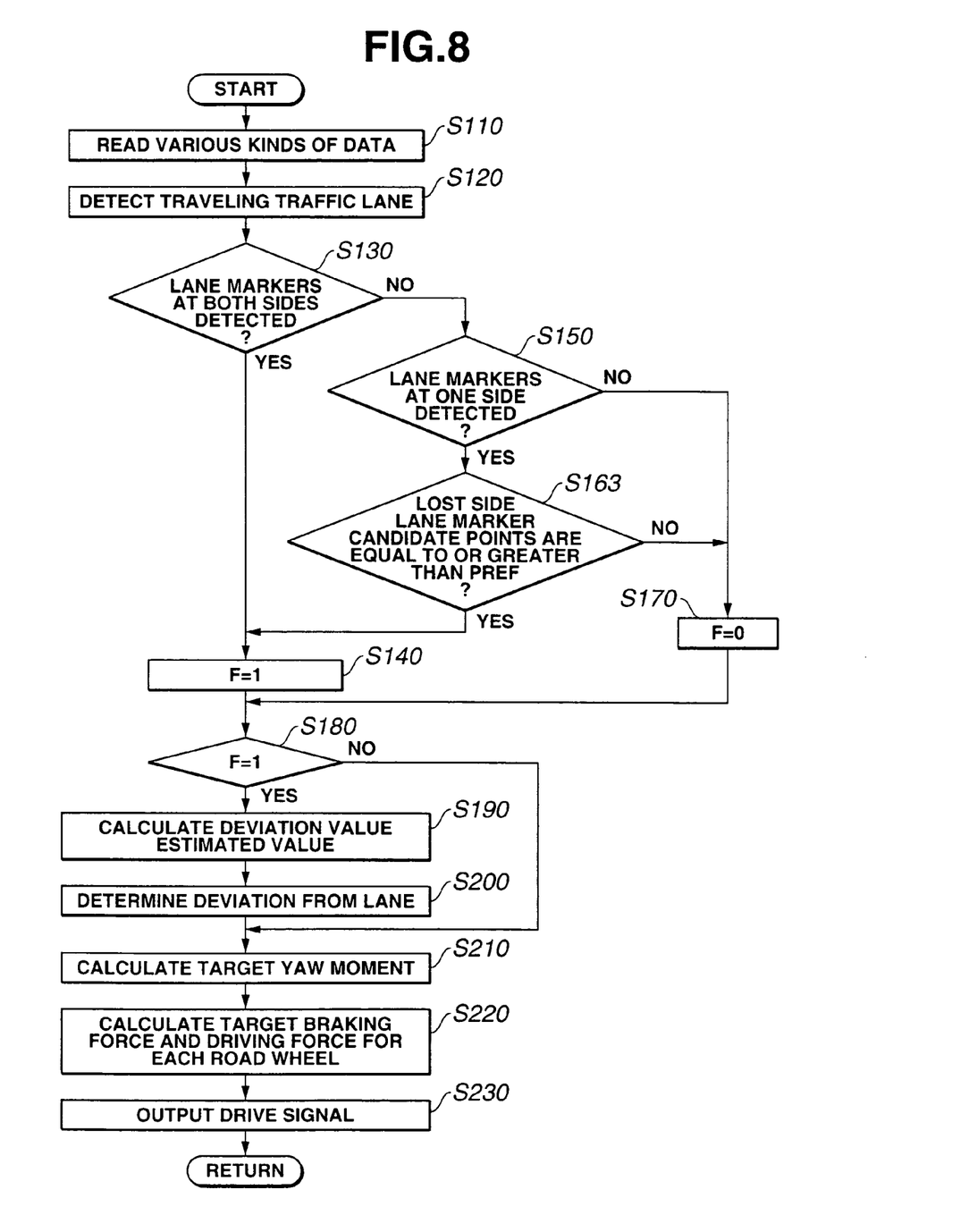
FIG. 8 is an operational flowchart executed in the lane keep control apparatus by means of the braking/driving force controller in a third preferred embodiment according to the present invention.

In the third embodiment, the flowchart shown in FIG. 8 is executed in place of FIG. 2 described in the first embodiment. However, since the same numbered steps described in the steps shown in FIG. 8 as those shown in FIG. 2 are present, the different steps will only be described below. That is to say, step S160 shown in FIG. 2 is changed to a step S163. At step S163, braking/driving controller 8 determines whether the number of lane marker candidate points of the lane market located at one side which cannot be detected (in FIG. 8, called lost side) is equal to or greater than a predetermined value (PREF). If the lost side lane marker candidate points is equal to or greater than predetermined value (PREF), the routine goes to step S140. If the number of lane marker candidate points is less than predetermined value Ref (No) at step S163, the routine goes to step S170. It is noted that predetermined value PREF of the number of lane markers candidate points is different from predetermined value to determine that the lane markers are correctly detected and indicate smaller value. In the calculation processing, in addition to an action of the first preferred embodiment, when only the lane number located at only one side of the traffic lane cannot be detected, lane keep control enable flag F is set to "1" at step S140 provided that the number of lane marker candidate points located at the opposite side which cannot be detected is equal to or greater than predetermined values PREF and the lane keep control is carried out in the same way as the first embodiment. It is noted that if the lane marker is a white dot line, even if the lane marker is correctly detected, there is a possibility that the lane marker candidate point is less than the predetermined value of a boundary of whether the lane marker is correctly detected. Then, even if only one side lane marker can correctly be detected, the number of lane marker candidate points is equal to or greater than predetermined value, the lane keep control is continued so that the lane keep control permits the assured vehicular deviation prevention from the deviation from the traffic lane.

As described above, each sensor shown in FIG. 1, camera controller 14, and steps S110 and S120 shown in FIG. 8 constitute traveling state detection means (section) in the case of the present invention, step S120 shown in FIG. 8 constitutes the traffic lane detection means (section) and lane marker detecting means (section), step S163 shown in FIG. 8 constitutes lane marker certainty detecting means (section), steps S190 and S200 shown in FIG. 8 constitutes deviation determining means (section), steps S210 through S230 shown in FIG. 8, braking fluid pressure control circuit 7 shown in FIG. 1, and drive (torque) controller 12 constitute vehicular behavior controlling means (section), and step S230 shown in FIG. 8, braking fluid pressure control circuit 7, and drive (torque) controller 12 constitute braking/driving force controlling means (section).

Next, a fourth preferred embodiment of the lane keep control apparatus according to the present invention will be described below. The structure of the vehicle to which the lane keep control apparatus is applicable is the same as described in the first embodiment shown in FIG. 1.

Figure 9:
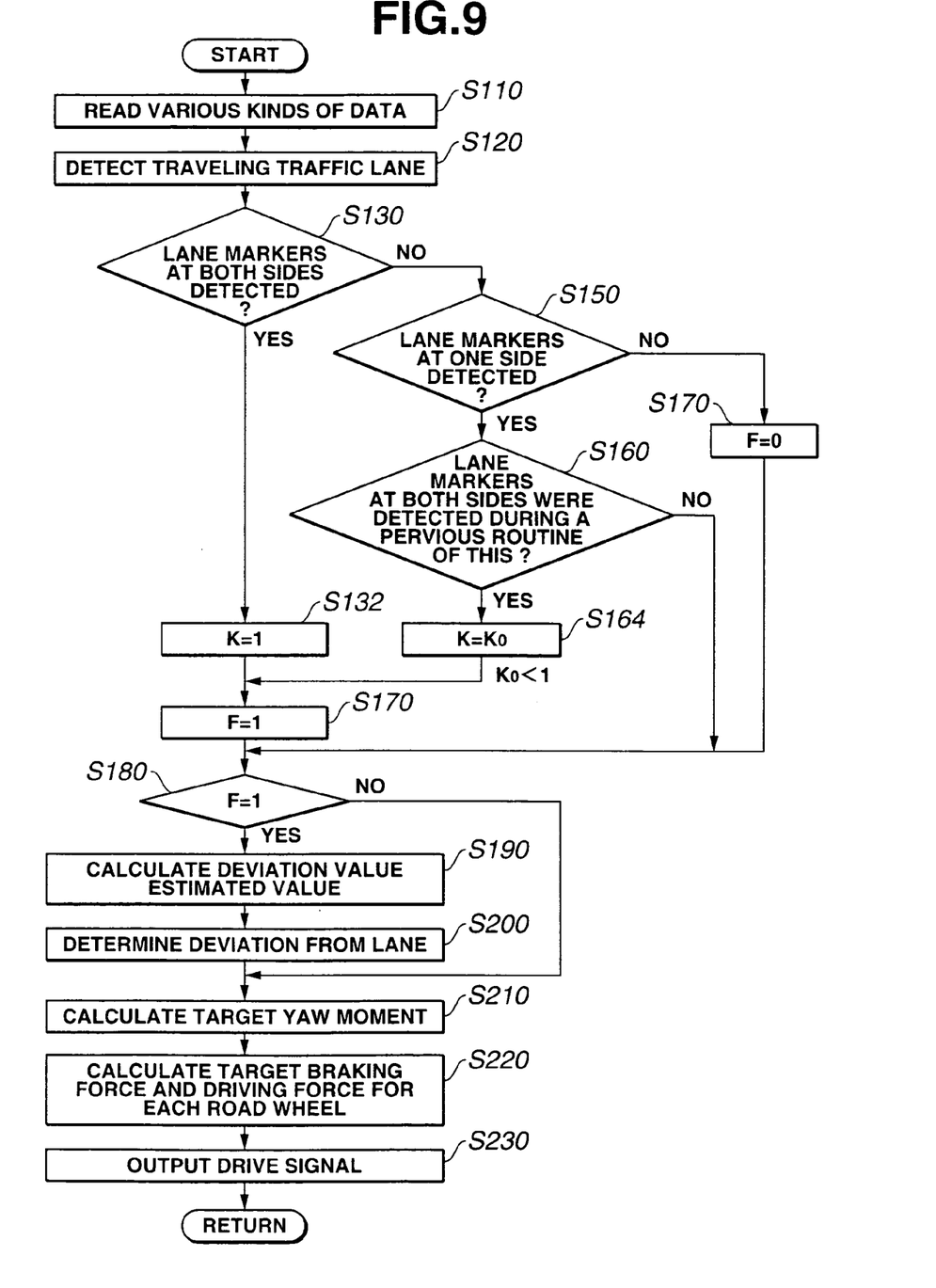
FIG. 9 is an operational flowchart executed in the lane keep control apparatus by means of the braking/driving force controller in a fourth preferred embodiment according to the present invention.

In the fourth embodiment, the flowchart described in the first embodiment with reference to FIG. 2 is modified to that shown in FIG. 9. Although the same numbered steps as those shown in FIG. 2 are present in the flowchart of FIG. 9, the details description thereof will herein be omitted. The different points are a step S132 which are interposed between steps S130 and S140, a step S164 which are interposed between step S160 and S140, and step S210 is wholly changed to a step S211.

That is to say, at step S132, a target yaw moment proportional coefficient k is set to "1" and the routine goes to step S140. At step S164, target yaw moment proportional coefficient k is set to a predetermined value smaller than "1" and the routine goes to step S140. Then, at step S211, target yaw moment Ms calculated at equation (3) is multiplied with target yaw moment proportional coefficient k to set the value to a new target yaw moment Ms and the routine goes to step S220.

According to the calculation processing, in addition to the action in the first embodiment, when a state in which the lane markers located at both sides of the traffic lane have been detected to a state in which only the lane marker located at only one side is detected, a target yaw moment proportional coefficient k which is constituted by a predetermined value $k_0$ smaller than one is set. Target yaw moment Ms is a controlled output of the lane keep control apparatus according to the present invention, a gain is modified to be smaller so that the controlled output when only one-side lane marker can be detected is adjusted to be smaller than that when both sides lane markers are detected. As described above, when the state is transferred from the state in which the lane markers located at both sides of the traffic lane are detected to a state in which the lane marker located only at either side of the traffic lane becomes detected, there is a high possibility that the vehicle is tended to be deviated in the deviation direction. Hence, it is desirable to continue the lane keep control. However, it can be said that the traffic lane is not accurately detected. Hence, during the detection of one-side lane marker, while the controlled output is reduced as described in the fourth embodiment, the lane keep control is continued so that an appropriate lane keep control under such a situation as described above can be achieved. It is noted that gain constituted by target yaw moment proportional coefficient k is varied in a stepwise manner but may be varied in a continuous manner. A method of reducing the controlled output can be carried out by reducing the number of times the control processes are executed or by shortening the continuous time duration of the control.

Each sensor shown in FIG. 1, camera controller 14, and steps S110 and S120 shown in FIG. 9 constitute traveling state detecting means (section) according to the present invention, step S120 shown in FIG. 9 constitutes traffic lane detecting means (section) and lane marker detecting means (section), step S190 shown in FIG. 9 and step S200 constitute deviation determining means (section), steps S211 through S230, braking fluid pressure control circuit 7, and drive (torque) controller 12 constitutes braking/driving controlled variable calculating means (section), and step S230 in FIG. 9, braking fluid pressure control circuit 7 shown in FIG. 1, and the drive torque control circuit 12 constitute braking/driving force controlling means (section).

Figure 10:
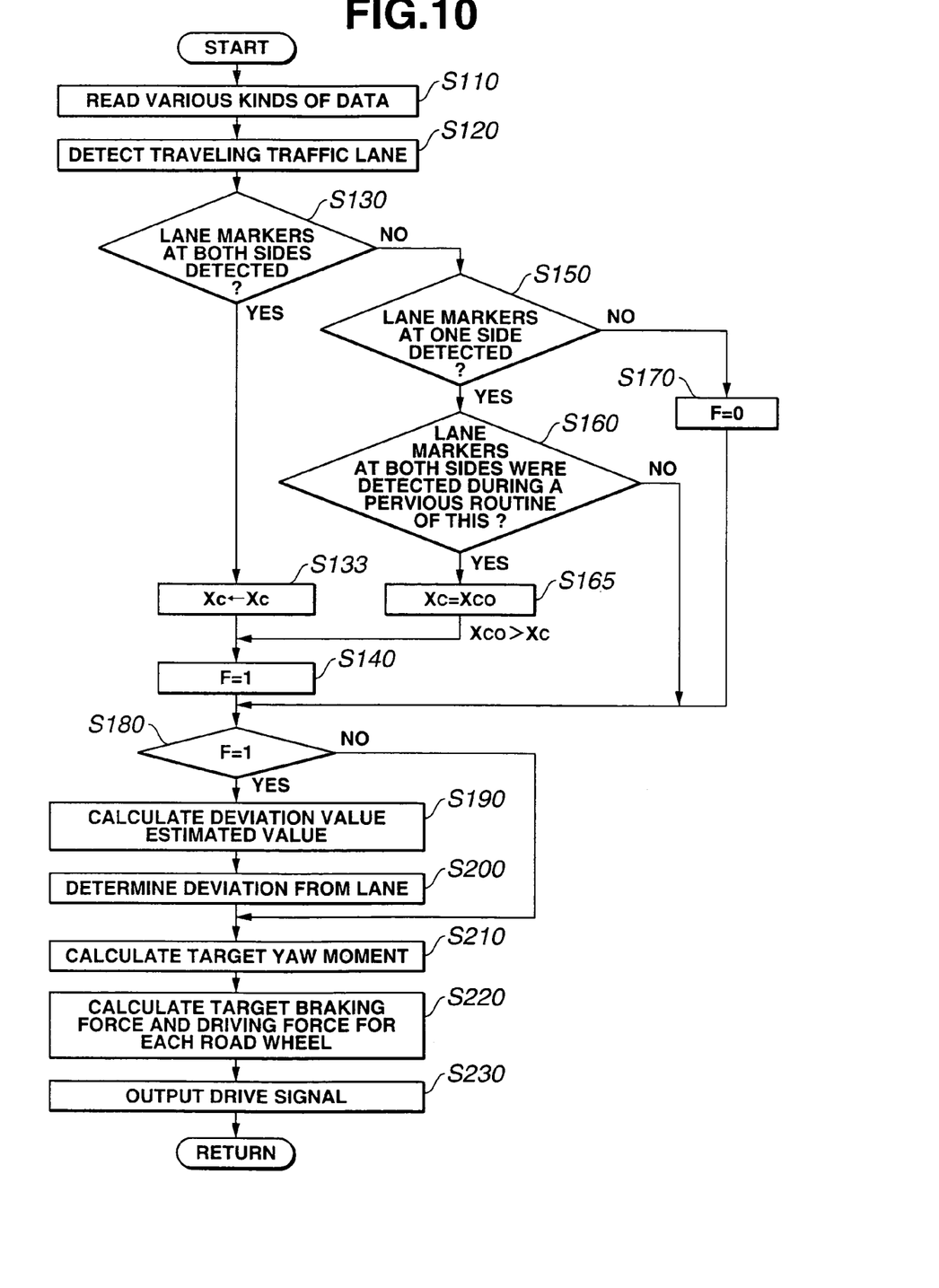
FIG. 10 is an operational flowchart executed in the braking/driving force controller in a fifth preferred embodiment according to the present invention.

Next, a fifth preferred embodiment of the lane keep control apparatus according to the present invention will be described below. The rough configuration of the vehicle to which the lane keep control apparatus in the fifth embodiment is applicable is the same described in the first embodiment as shown in FIG. 1. The operational flowchart executed by braking/driving force controller 8 is changed from that shown in FIG. 2 to FIG. 10 in the fifth preferred embodiment. The same numbered steps shown in FIG. 10 are the same as shown in FIG. 2 so that the detailed description thereof will herein be omitted. The difference points are a step S133 interposed between steps S130 and S140 and a step S165 interposed between steps S160 and S140.

At step S133 in FIG. 10, braking/driving force controller 8 changes from lateral displacement limit value $X_c$ to determine the deviation tendency directly to the lateral displacement limit value $X_c$ and goes to step S140. At step S165, braking/driving force controller 8 sets the lateral displacement limit value of $X_c$ to determine the deviation tendency to a predetermined value of $X_{c0}$ which is greater than lateral displacement limit value $X_c$. In FIG. 10, in addition to the action in the case of the first embodiment, when a state from a state in which the lane markers located at both sides of the traffic lane have been detected to a state in which only the lane marker located at either side of the traffic lane is detected, predetermined value $X_{c0}$ which is larger than the natural (original) lateral displacement limit value (control threshold value) $X_c$ is set to the new lateral displacement limit value $X_c$ and the determination of the deviation tendency is carried out using this lateral displacement limit value $X_c$. In this case, since, if an absolute value |Xs| of the future estimated lateral displacement is equal to or greater than lateral displacement limit value $X_c$, deviation determination flag $F_{LD}$ is set due to the deviation tendency from the traffic lane of the vehicle, it is difficult to determine the deviation tendency if lateral displacement limit value $X_c$ becomes large and a timing at which the lane keep control is interrupted becomes late. That is to say, target yaw moment Ms indicates zero. In addition, target yaw moment Ms calculated in equation (3) indicates a smaller value and the controlled output of the lane keep control apparatus in the fifth embodiment is adjusted to be a smaller value. That is to say, target yaw moment Ms is the controlled output of the lane keep control apparatus in the fifth embodiment. That is to say, target yaw moment Ms is the controlled output of the lane keep control apparatus in the fifth embodiment. Since the control threshold value $X_c$ is largely modified, the controlled output when only the lane marker located at one side of the traffic lane can be carried out is adjusted to be smaller than the controlled output at which the lane marker at both sides thereof is detected. As described above since when the state is transferred from the lane markers located at both sides of the traffic lane are detected to the state in which the lane marker located only at one side of the traffic lane becomes detected, there is a high possibility that the deviation from the lane tends to occur in the direction toward which only the lane marker locate only at one side is detected. Hence, it is desirable to continue the traffic lane deviation prevention control (lane keep control). However, the traffic lane on which the vehicle is running cannot still be perfectly accurately be detected. When the lane marker located only at one side is detected, the lane keep control is continued while reducing the controlled output as in the fifth embodiment, the appropriate traffic lane keep control can be achieved under such a situation as described above. In the fifth embodiment, a threshold value of lateral displacement limit value $X_c$ is varied in the stepwise manner, it may be varied continuously.

As described above, each sensor shown in FIG. 1, camera controller 14, and steps S110 and S120 shown in FIG. 10 constitute traveling state detecting means (section), step S120 shown in FIG. 10 constitutes traffic lane detecting means (section) and lane marker detection means (section), steps S190 and S200 constitute deviation determining means (section), steps S190 and S210 shown in FIG. 10 constitute deviation determining means (section), step S133 shown in FIG. 10, step S165, and steps S210 through S230, braking fluid pressure control circuit 7, and drive (torque) controller 12 constitute vehicular behavior (motion) controlling means (section), step S220 shown in FIG. 10 constitute braking/driving force controlled variable calculating means (section). Step S220 in FIG. 10 constitutes braking/driving force controlled variable calculating means (section) and step S230 in FIG. 10, braking fluid pressure control circuit 7 shown in FIG. 1, and drive (torque) controller 12 constitute braking/driving force controlling means (section).

It is noted that, in each of the first through fifth embodiments, lateral displacement limit value $X_c$ which is the control threshold value of determining the deviation of the vehicle from the traffic lane is calculated according to the vehicular width and traffic lane width. However, for example, since the traffic lane width in the case of a Japanese domestic high-speed express way is fixed as 3.35 meters, lateral displacement limit value $X_c$ may be fixed to, for example, 0.8 meters. It is noted that the driving force defined in the claims includes the braking force since the braking force is negative to the driving force.

The entire contents of a Japanese Patent Application No. 2002-342054 (filed in Japan on Nov. 26, 2002) are herein incorporated by reference. The scope of the invention is defined with reference to the following claims.

What is claimed is:

1. A lane keep control apparatus for an automotive vehicle, comprising:
   a traffic lane detecting section that detects a traffic lane on which the vehicle is running;
   a traveling state detecting section that detects a traveling state of the vehicle;
   a deviation determining section that determines whether the vehicle has a tendency to be deviated from the traffic lane according to the traffic lane detected by the traffic lane detecting section and the traveling state of the vehicle detected by the traveling state detecting section; and
   a vehicular behavior controlling section that controls a behavior of the vehicle in such a manner that a yaw moment of the vehicle is developed in a direction to avoid a deviation of the vehicle from the traffic lane in accordance with the traveling state detected by the traveling state detecting section when the deviation determining section determines that the vehicle has a tendency of the deviation of the vehicle from the traffic lane, the traffic lane detecting section including a lane marker detecting section that detects lane markers, each lane marker representing one side of the traffic lane, and the vehicular behavior controlling section controlling the behavior of the vehicle on the basis of the detected lane marker at one side of the traffic lane when the lane marker detecting section transfers a detection state from a state in which both of the lane markers at both sides of the traffic lane are detected to a state in which the lane marker only at one side of the traffic lane is detected.

2. A lane keep control apparatus for an automotive vehicle, as claimed in claim 1, further comprising a lane marker certainty detecting section that detects a certainty of the traffic lane of the vehicle detected by the lane marker detecting section and wherein the vehicular behavior controlling section controls the behavior of the vehicle on the basis of a certainty of the lane marker detected by the lane marker certainty detecting section when the lane marker detecting section transfers the detection state from the state in which both of the lane markers at both sides of the traffic lane are detected to the state in which the lane marker only at one side of the traffic lane is detected.

3. A lane keep control apparatus for an automotive vehicle, as claimed in claim 2, wherein the lane marker certainty detecting section detects the certainty of the lane marker on the basis of a continuation time for which the lane marker is detected by the lane marker detecting section.

4. A lane keep control apparatus for an automotive vehicle, as claimed in claim 2, wherein the lane marker detecting section detects the lane marker at a plurality of different regions on a photographed image and specifies a representative position of the lane marker at each of the regions and wherein the lane marker certainty detecting section detects the certainty of the lane marker on the basis of the number of specified representative positions of the lane marker on the respective regions detected by the lane marker detecting section.

5. A lane keep control apparatus for an automotive vehicle, as claimed in claim 1, wherein the vehicular behavior controlling section reduces a control output smaller than the control output at a time at which both of the lane markers located at both sides of the traffic lane are detected, when the lane marker detecting section transfers the detection state from the state in which both of the lane markers at both sides of the traffic lane are detected to the state in which the lane marker only at one side of the traffic lane is detected.

6. A lane keep control apparatus for an automotive vehicle, as claimed in claim 5, wherein the vehicular behavior controlling section reduces a controlled output by modifying a control gain.

7. A lane keep control apparatus for an automotive vehicle, as claimed in claim 5, wherein the vehicular behavior controlling section reduces a controlled output by modifying a control threshold value (Xc).

8. A lane keep control apparatus for an automotive vehicle, as claimed in claim 1, wherein the vehicular behavior controlling section includes a braking/driving force controlled variable calculating section that calculates a driving force controlled variable for each road wheel of the vehicle to develop the yaw moment in a direction avoiding the deviation of the vehicle from the traffic lane and braking/driving force controlling section that controls the driving force applied to each road wheel in accordance with the driving force controlled variable calculated by the braking/driving force controlled variable calculating section.

9. A lane keep control apparatus for an automotive vehicle, as claimed in claim 2, wherein the lane marker detecting section comprising a lane marker detection area setting section that sets a lane marker detection area on the basis of a steering angle δ of the vehicle and the lane marker detecting section detects the lane markers at both sides of the traffic lane on the basis of the lane marker detection area.

10. A lane keep control apparatus for an automotive vehicle, as claimed in claim 9, wherein the traffic lane detecting section detects the traffic lane on which the vehicle is traveling using the lane markers at both sides in the lane marker detection area.

11. A lane keep control apparatus for an automotive vehicle, as claimed in claim 2, further comprising: a one-side lane marker presence determining section that determines whether the lane marker only at one side of the traffic lane is detected when both-side lane markers are not detected and wherein the lane marker certainty detecting section comprises a both-side lane marker presence determining section that determines whether, at a previous process of a vehicular behavior control, the lane markers at both sides of the traffic lane have been detected when the one-side lane marker determining section determines that the lane marker only at one side of the traffic lane is detected.

12. A lane keep control apparatus for an automotive vehicle, as claimed in claim 11, wherein, when the both-side lane marker presence determining section determines that, at the previous process of the vehicular behavior control, the lane markers at both sides of the traffic lane have been detected, the vehicular behavior controlling section comprises: a future lateral displacement calculating section that calculates a future estimated lateral displacement XS in accordance with a yaw angle φ of the vehicle with respect to the traffic lane, a lateral displacement X from a center of the traffic lane, a curvature β of the traffic lane, and a vehicular velocity V of the vehicle and wherein the deviation determining section determines whether the vehicle has the tendency of the deviation of the vehicle from the traffic lane according to whether an absolute value of the future estimated lateral displacement |XS| is equal to or greater than a predetermined lateral displacement limit value Xc.

13. A lane keep control apparatus for an automotive vehicle, as claimed in claim 12, wherein the vehicular behavior controlling section comprises a target yaw moment calculating section that calculates a target yaw moment Ms using a proportional coefficient $K_1$ determined according to vehicle specifications, another proportional coefficient $K_2$ set in accordance with a vehicular velocity V, calculated lateral displacement XS, and the predetermined lateral displacement limit value Xc when the deviation determining section determines that the vehicle has the tendency of the deviation of the vehicle from the lane.

14. A lane keep control apparatus for an automotive vehicle, as claimed in claim 13, wherein the vehicular behavior controlling section comprises a target yaw moment magnitude dependent braking force calculating section that calculates a front left-and-right wheel braking liquid pressure difference $\Delta P_{SF}$ to be zeroed and a rear left-and-right wheel braking fluid pressure difference $\Delta P_{SR}$ to be given as follows: $\Delta P_{SR} = 2 \times K_{bR} \times |Ms|/T$, wherein $K_{bR}$ denotes a predetermined conversion coefficient to convert a braking force into a braking fluid pressure and T denotes a tread of the vehicle, when the magnitude of the target yaw moment |Ms| is smaller than a predetermined yaw moment $M_{s0}$ and calculates the front left-and-right wheel braking liquid pressure difference $\Delta P_{SF}$ to be given as follows: $\Delta P_{SF} = 2 \times K_{bF} \times (|Ms| - M_{s0})/T$, and the rear left-and-right wheel braking fluid pressure difference $\Delta P_{SR}$ to be given as follows: $\Delta P_{SR} = 2 \times K_{bR} \times (|M_{s0}|)/T$.

15. A lane keep control apparatus for an automotive vehicle, as claimed in claim 14, wherein, when the target yaw moment Ms is a negative value, a target braking liquid fluid pressure for each wheel cylinder of front left and right road wheels and rear left and right road wheels $P_{sFL}$, $P_{sFR}$, $P_{sRL}$, and $P_{sRR}$ are as follows: $P_{sFL} = Pm$, $P_{sFR} = Pm + \Delta P_{SF}$, $P_{SEL} = Pm$, and $P_{SRR} = Pm + \Delta P_{SR}$, wherein Pm denotes a master wheel cylinder fluid pressure.

16. A lane keep control apparatus for an automotive vehicle, as claimed in claim 14, wherein, when the target yaw moment Ms is a positive value, a target braking liquid fluid pressure for each wheel cylinder of front left and right road wheels and rear left and right road wheels $P_{sFL}$, $P_{sFR}$, $P_{sRL}$, and $P_{sRR}$ are as follows: $P_{sFL} = Pm + \Delta P_{SF}$, $P_{sFR} = Pm$, $P_{SEL} = Pm + \Delta P_{SR}$, and $P_{SRR} = Pm$, wherein Pm denotes a master wheel cylinder pressure.

17. A lane keep control apparatus for an automotive vehicle, as claimed in claim 16, wherein the vehicular behavior controlling section calculates and outputs a target drive torque $Trq_{DS}$ depending upon the determination of the deviation determining section that the vehicle has the tendency to be deviated from the traffic lane and according to the front and rear left-and-right fluid pressure differences $\Delta P_{SF}$ and $\Delta P_{SR}$ and wherein the target drive torque is outputted to a drive controller.

18. A lane keep control apparatus for an automotive vehicle, as claimed in claim 11, wherein the lane marker detecting section comprises a lane marker counter that increments whenever the both-side lane markers are detected in the lane marker detection area and wherein, when a count value of the lane marker counter (CNT) is equal to or larger than a preset value $CNT_0$, the vehicular behavior controlling section controls the behavior of the vehicle in such a manner that the yaw moment is developed in the direction to avoid the deviation of the vehicle from the traffic lane.

19. A lane keep control apparatus for an automotive vehicle, comprising:
traffic lane detecting means for detecting a traffic lane on which the vehicle is running;
traveling state detecting means for detecting a traveling state of the vehicle;
deviation determining means for determining whether the vehicle has a tendency to be deviated from the traffic lane according to the traffic lane detected by the traffic lane detecting means and the traveling state of the vehicle detected by the traveling state detecting means; and
vehicular behavior controlling means for controlling a behavior of the vehicle in such a manner that a yaw moment of the vehicle is developed in a direction to avoid a deviation of the vehicle from the traffic lane in accordance with the traveling state detected by the traveling state detecting means when the deviation determining means determines that the vehicle has a tendency of the deviation of the vehicle from the traffic lane, the traffic lane detecting means including lane marker detecting means for detecting lane markers, each lane marker representing one side of the traffic lane, and the vehicular behavior controlling means controlling the behavior of the vehicle on the basis of the detected lane marker at one side of the traffic lane when the lane marker detecting section transfers a detection state from a state in which both of the lane markers at both sides of the traffic lane are detected to a state in which the lane marker only at one side of the traffic lane is detected.

20. A lane keep control method for an automotive vehicle, comprising:
detecting a traffic lane on which the vehicle is running;
detecting a traveling state of the vehicle;
determining whether the vehicle has a tendency to be deviated from the traffic lane according to the detected traffic lane and the detected traveling state of the vehicle; and
controlling a behavior of the vehicle in such a manner that a yaw moment of the vehicle is developed in a direction to avoid a deviation of the vehicle from the traffic lane in accordance with the detected traveling state when determining that the vehicle has a tendency of the deviation of the vehicle from the traffic lane, during the traffic lane detection, detecting lane markers, each lane marker representing one side of the traffic lane, and controlling the behavior of the vehicle on the basis of the detected lane marker at one side of the traffic lane, when a detection state is transferred from a state in which both of the lane markers at both sides of the traffic lane are detected to a state in which the lane marker only at one side of the traffic lane is detected.

* * * * *